United States Patent [19]

Umeno

[11] Patent Number: 5,808,290

[45] Date of Patent: *Sep. 15, 1998

[54] MAGNETIC DATA PROCESSING DEVICE INCLUDING ROLLERS FOR CONVEYING BANKBOOK WITH REDUCED PINCHING PRESSURE

[75] Inventor: Hideyuki Umeno, Kawasaki, Japan

[73] Assignee: Fujitsu Limited, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 733,336

[22] Filed: Oct. 17, 1996

Related U.S. Application Data

[63] Continuation of Ser. No. 241,419, May 12, 1994, abandoned.

[30] Foreign Application Priority Data

Aug. 10, 1993 [JP] Japan .................................. 5-198353

[51] Int. Cl.⁶ .................................................. G06K 13/06
[52] U.S. Cl. ............................................. 235/475; 235/485
[58] Field of Search ................................. 235/475, 479, 235/449, 485, 379; 902/17, 18, 19

[56] References Cited

U.S. PATENT DOCUMENTS

| | | | |
|---|---|---|---|
| 4,259,699 | 3/1981 | Yoshida | 360/88 |
| 4,279,413 | 7/1981 | Siwik et al. | 271/274 |
| 4,470,591 | 9/1984 | Acquaviva | 271/245 |
| 4,743,129 | 5/1988 | Keryhuel et al. | 235/479 |
| 4,806,744 | 2/1989 | Briane et al. | 235/479 |
| 4,944,616 | 7/1990 | Watanabe et al. | 235/379 |
| 4,988,853 | 1/1991 | Nagashima et al. | 235/449 |
| 4,995,184 | 2/1991 | Ebato et al. | 902/19 |
| 5,136,144 | 8/1992 | Swinton et al. | 235/379 |
| 5,142,129 | 8/1992 | Nakamura et al. | 235/379 |
| 5,362,951 | 11/1994 | Kanazawa et al. | 235/449 |
| 5,483,050 | 1/1996 | Fukasawa | 235/475 |

FOREIGN PATENT DOCUMENTS

| | | |
|---|---|---|
| 61-153789 | 7/1986 | Japan . |
| 3-135686 | 6/1991 | Japan . |

*Primary Examiner*—Donald T. Hajec
*Assistant Examiner*—Mark Tremblay
*Attorney, Agent, or Firm*—Staas & Halsey

[57] ABSTRACT

A magnetic data processing device for a bankbook having a magnetic stripe. A magnetic head is arranged for reading and writing magnetic data when the bankbook is in a magnetic data processing position. Three rows of drive and pinch rollers are arranged to convey the bankbook. The central row is arranged near the magnetic head, and the pinch rollers of the outside rows a removable for regulating the pinching pressure between the respective drive and pinch rollers. The pinching pressure is reduced when the bankbook is substantially within the magnetic data processing position. Also, the magnetic head is movable between a normally retracted position and an operative position when the bankbook is substantially within the magnetic data processing position. Also, a dummy head is provided.

22 Claims, 17 Drawing Sheets

5,808,290

MAGNETIC DATA PROCESSING DEVICE INCLUDING ROLLERS FOR CONVEYING BANKBOOK WITH REDUCED PINCHING PRESSURE

This application is a continuation of application Ser. No. 08/241,419, filed May 12, 1994, now abandoned.

BACKGROUND OF THE INVENTION

1. Field of the Invention

The present invention relates to a magnetic data processing device for a book-type magnetic recording medium such as a bankbook used in a financial institution. The present invention also relates to a book-type magnetic recording medium handling device including a magnetic data processing device.

2. Description of the Related Art

Financial institutions have bankbook management systems for managing data in the bankbooks, and the bankbook management systems include bankbook handling devices with magnetic data processing devices, for reading and writing magnetic data in the bankbooks or for printing data on the bankbooks. With the increased use of the bankbooks, it becomes necessary to handle the bankbooks at a higher speed. To this end, attempts are being made to increase the printing speed. However, this solution is not satisfactory because the size of the devices becomes larger and a manufacturing cost becomes higher, and this does not meet the user's requirements. Another solution is to increase the conveying speed of the bankbook while the magnetic data is processed so as to shorten the total handling time.

The magnetic data processing devices are classified into the following two types. In one type, the bankbook is held stationary and the magnetic head is moved. In the second type, the magnetic head is held stationary and the bankbook is moved. In the first type, it is necessary to convey the bankbook to a magnetic data processing position, and then to stop the bankbook there for carrying out reading or writing magnetic data, by the moving magnetic head. Accordingly, it is difficult to increase the bankbook handling speed. Also, it is necessary to move the magnetic head at a constant speed relative to the bankbook and thus an approach run area is needed for the magnetic head and its actuating motor, so the size of the devices becomes larger.

In the second type, it is not necessary to stop the bankbook to read or write magnetic data, and thus it is possible to increase the bankbook conveying speed, compared with the first type. It is also not necessary to provide an approach run area for the magnetic head and its actuating motor, so the size of the devices can be smaller. However, it is desired to further increase the bankbook conveying speed, and in this case, a problem arises in that the bankbook conveying speed fluctuates or the bankbook becomes slanted, when the leading edge of the bankbook moves quickly into the gap between the drive and pinch rollers, when the trailing edge of the bankbook leaves the drive and pinching rollers, and when the bankbook collides against or is frictionally engage with the magnetic head. From these reasons, correct magnetic data processing is disturbed or the operation of other parts such as a printer is affected by the speed fluctuation or the slant of the book.

SUMMARY OF THE INVENTION

The object of the present invention is to provide a magnetic data processing device for a book-type magnetic recording medium by which a handling speed of the book-type magnetic recording medium can be increased.

Another object of the present invention is to provide a magnetic data processing device for a book-type magnetic recording medium by which a possibility of an error occurring during reading and writing magnetic data is minimized.

A further object of the present invention is to provide a magnetic data processing device for a book-type magnetic recording medium by which the device can be constructed in a compact size.

A further object of the present invention is to provide a book-type magnetic recording medium handling device including the above described magnetic data processing device.

According to one aspect of the present invention, there is provided a magnetic data processing device for a book-type magnetic recording medium having a magnetic recording portion, said device comprising a magnetic head arranged at a substantially stationary position for reading and writing magnetic data from and to a magnetic recording portion of a travelling book-type magnetic recording medium when the book-type magnetic recording medium is in a magnetic data processing position; first conveying means arranged near the magnetic head and including at least one pair of drive and pinch rollers for pinching a book-type magnetic recording medium therebetween to convey the book-type magnetic recording medium; second conveying means arranged on one side of the first conveying means and including at least one pair of drive and pinch rollers for pinching the book-type magnetic recording medium therebetween to convey the book-type magnetic recording medium to and from the first conveying means; third conveying means arranged on the other side of the first conveying means and including at least one pair of drive and pinch rollers for pinching the book-type magnetic recording medium therebetween to convey the book-type magnetic recording medium to and from the first conveying means; actuating means for rotationally actuating the drive rollers of the first, second, and third conveying means, respectively; detecting means for detecting the position of a book-type magnetic recording medium conveyed by the first conveying, second and third conveying means; pressure regulating means arranged in cooperation with at least one pinch roller of the second and third conveying means to move the at least one pinch roller relative to the drive roller in the corresponding pair for regulating the pinching pressure between the at least one pinch roller and the drive roller; and control means for controlling the pressure regulating means in response to the detecting means so that the pinching pressure between the at least one pinch roller and the drive roller is reduced when the book-type magnetic recording medium is substantially within the magnetic data processing position.

According to another aspect of the present invention, there is provided a magnetic data processing device for a book-type magnetic recording medium having a book-type magnetic recording portion, said device comprising a magnetic head arranged at a substantially stationary position for reading and writing magnetic data from and to a magnetic recording portion of a travelling book-type magnetic recording medium when the book-type magnetic recording medium is in a magnetic data processing position; first conveying means arranged near the magnetic head and including at least one pair of drive and pinch rollers for pinching a book-type magnetic recording medium therebetween to convey the book-type magnetic recording medium; second conveying means arranged on one side of the first conveying means and including at least one pair of drive and pinch rollers for pinching the book-type magnetic recording medium therebetween to convey the book-type magnetic recording medium to and from the first conveying means; third conveying means arranged on the other side of the first conveying means and including at least one pair of drive and pinch rollers for pinching the book-type magnetic recording medium therebetween to convey the book-type magnetic recording medium to and from the first conveying means; actuating means for rotationally actuating the drive rollers of first, second, and third conveying means, respectively; detecting means for detecting the position of a book-type magnetic recording medium conveyed by the first conveying means, second, and third conveying means; position regulating means arranged in cooperation with the magnetic head to move the magnetic head between an operative position in which the magnetic head is in contact with the book-type magnetic recording medium and a retracted position in which the magnetic head is retracted from the path of the book-type magnetic recording medium; and control means for controlling the position regulating means in response to the detecting means so that the magnetic head is normally in the retracted position, and the magnetic head is in the operative position when the book-type magnetic recording medium is substantially within the magnetic data processing position.

According to a further aspect of the present invention, there is provided a magnetic data processing head unit for a book-type magnetic recording medium, said unit comprising a unit frame; a magnetic head mounted to the unit frame for reading and writing magnetic data of a book-type magnetic recording medium; and a dummy head having a configuration similar to that of the magnetic head and mounted to the unit frame at such a position relative to the magnetic head that a friction between the dummy head and the book-type magnetic recording medium balances a friction between the magnetic head and the book-type magnetic recording medium.

It is possible to adequately combine these features.

Further, it is possible to construct a magnetic data recording medium handling device including one or more of these features.

BRIEF DESCRIPTION OF THE DRAWINGS

The present invention will become more apparent from the following description of the preferred embodiments, with reference to the accompanying drawings, in which.

DESCRIPTION OF THE PREFERRED EMBODIMENTS

Figure 1:
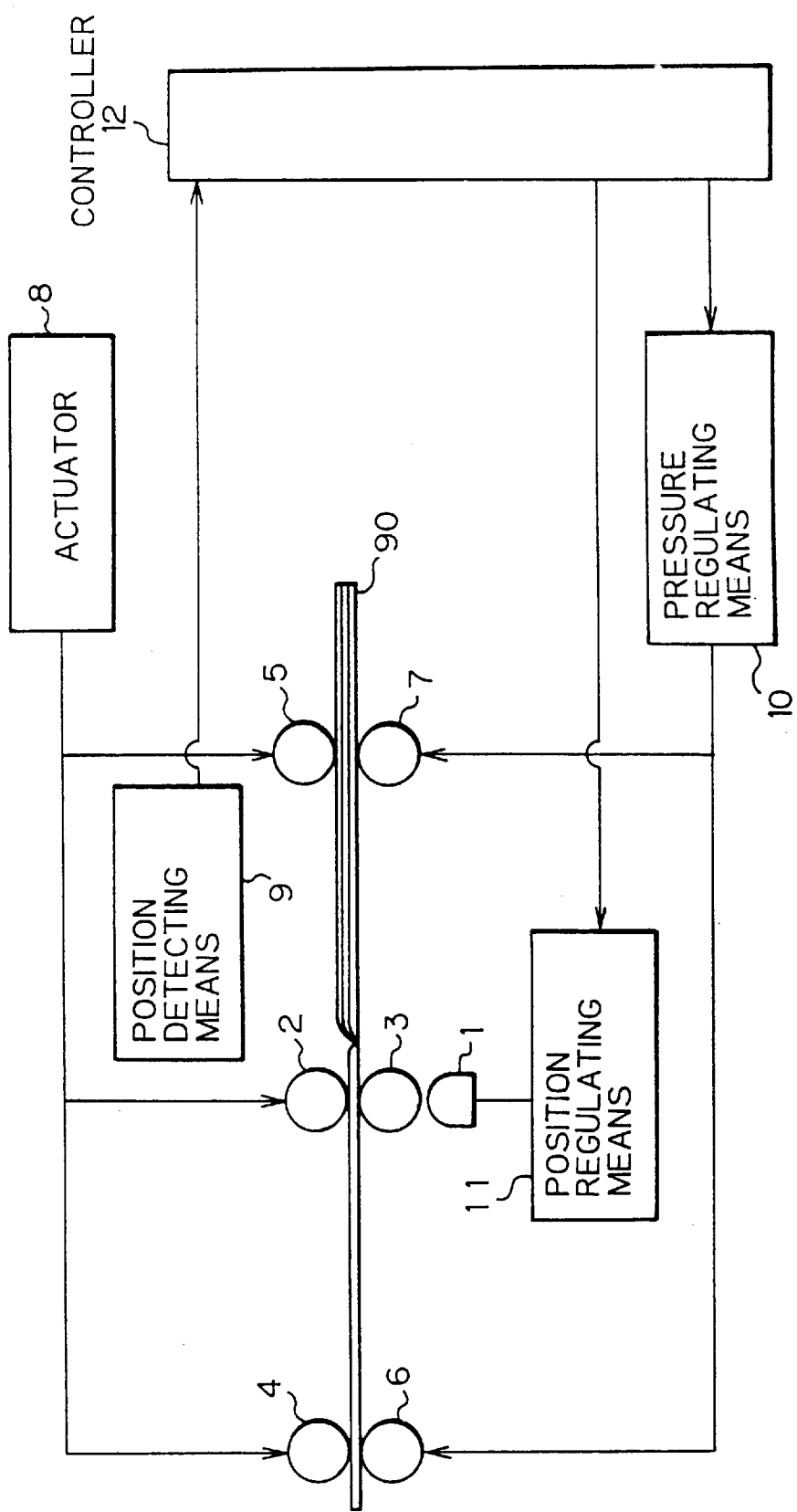
FIG. 1 is a diagrammatic elevational view of a magnetic data processing device according to the embodiment of the present invention.
Figure 2:
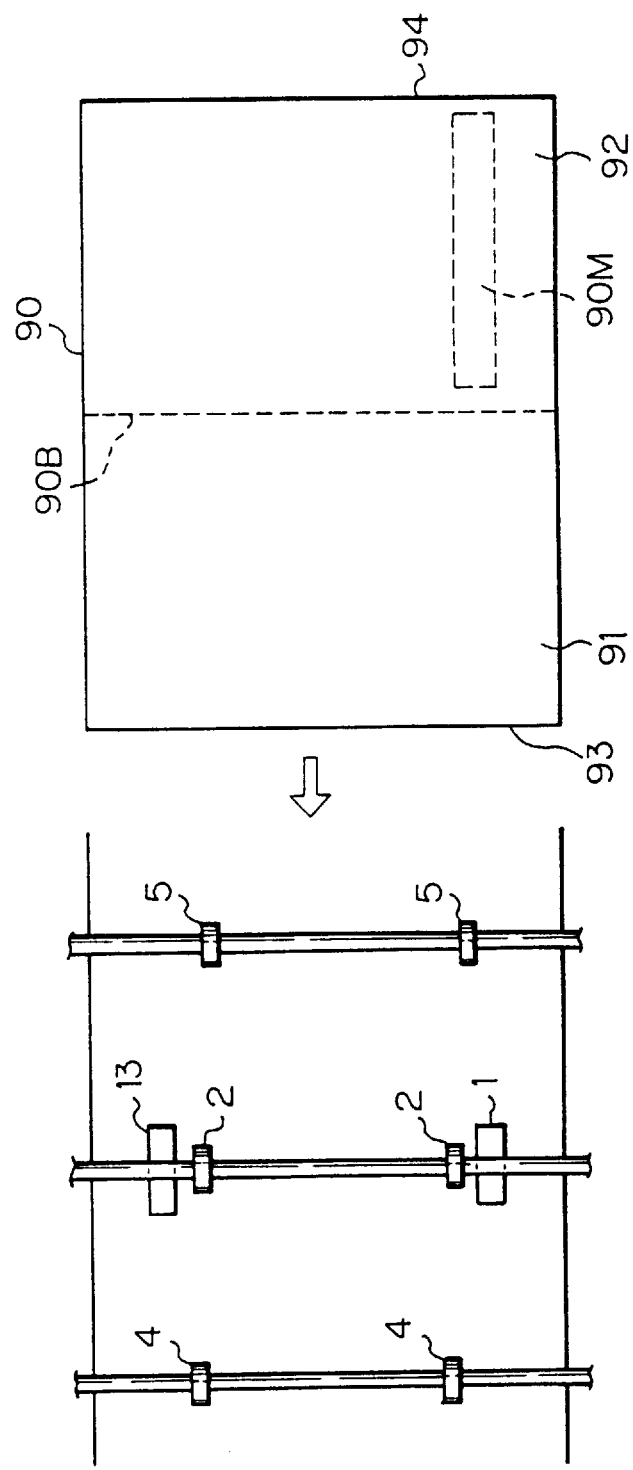
FIG. 2 is a diagrammatic plan view of the device of FIG. 1, with a bankbook being inserted in the device.

FIGS. 1 and 2 show a magnetic data processing device for a book-type magnetic recording medium, for example, a bankbook 90. The magnetic data processing device comprises a magnetic head 1 arranged at a substantially stationary position for reading and writing magnetic data from and to a magnetic recording portion of a travelling bankbook 90 when the bankbook 90 is in a magnetic data processing position, i.e., when the bankbook 90 is in a position where a magnetic recording portion of the bankbook 90 overlaps the magnetic head 1 and the latter can read or write magnetic data in the magnetic recording portion.

Figure 3:
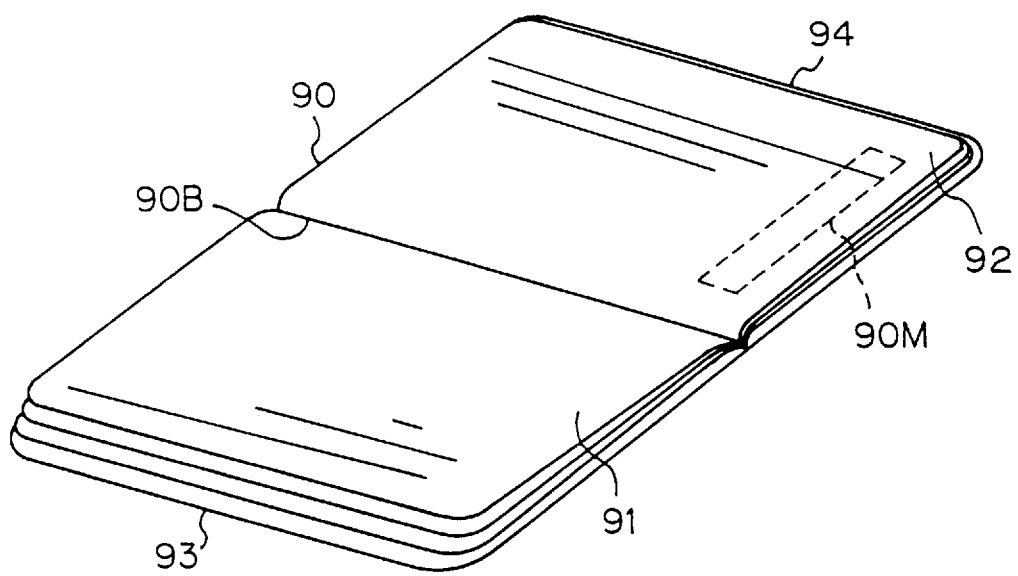
FIG. 3 is a perspective view of the bankbook.

As shown in FIGS. 2 and 3, when the bankbook 90 is opened, the surface of the bankbook 90 is called a spread which comprises two pages 91 and 92 and an inner binding portion or a gutter 90B between two pages 91 and 92. A magnetic recording portion in the form of a magnetic stripe 90M is arranged on one of two pages 91 and 92 and extends perpendicular to the inner binding portion 90B, leaving margins on the page 92 at both sides of the magnetic stripe 90M. The opened bankbook 90 has leading and trailing edges 93 and 94, respectively, depending on the conveying direction of the bankbook 90. In the embodiment, the bankbook 90 is conveyed from right to left in FIGS. 1 to 3 when reading magnetic data in the magnetic stripe 90M, as shown by the arrow in FIG. 2. In this case, the leading edge of the bankbook 90 is the edge 93. Also, the leading edge of one of the pages 92 having the magnetic stripe 90M is the inner binding portion 90B. The bankbook 90 is conveyed in reverse when writing magnetic data to the magnetic stripe 90M.

In FIGS. 1 and 2, the magnetic data processing device comprises three rows of conveying rollers 2–3, 4–6, and 5–7 arranged in the conveying direction. The first, central row includes two pairs of drive and pinch rollers 2 and 3. The magnetic head 1 is arranged near a first pair of drive and pinch rollers 2 and 3, and a dummy head 13 is arranged near the other pair of drive and pinch rollers 2 and 3. The second row includes two pairs of drive and pinch rollers 4 and 6 arranged on one side of the first row of drive and pinch rollers 2 and 3. The third row includes two pairs of drive and pinch rollers 5 and 7 arranged on the other side of the first row of drive and pinch rollers 2 and 3.

The distance between the first row of drive and pinch rollers 2 and 3 and the second row of drive and pinch rollers 4 and 6 is smaller than the length of the bankbook 90 to be conveyed, and the distance between the first row of drive and pinch rollers 2 and 3 and the third row of drive and pinch rollers 5 and 7 is smaller than the length of the bankbook 90 to be conveyed. Accordingly, bankbook 90 can be conveyed continuously by these rollers.

Actuator 8 comprising a pulse motor is arranged for rotationally actuating the drive rollers 2, 4 and 5. Position detecting means 9 is arranged for detecting the position of the bankbook 90. Pressure regulating means 10 is arranged in cooperation with the pinch rollers 6 and 7 of the second and third row to move the pinch roller 6 and 7 relative to the respective drive roller 4 and 5 for regulating the pinching pressure between the pinch and drive rollers 4–6, and 5–7.

A controller 12 is arranged for controlling the pressure regulating means 10 in response to the position detecting means 9 so that the pinching pressure between the at least one pinch roller 6 or 7 and the drive roller 4 or 5 in the second and third row is reduced when the bankbook 90 is substantially within the magnetic data processing position.

Also, position regulating means 11 is arranged in cooperation with the magnetic head 1 to move the magnetic head 1 between an operative position in which the magnetic head 1 is in contact with the bankbook 90 and a retracted position in which the magnetic head 1 is retracted from a travelling course of the bankbook 90.

The controller 12 also controls the position regulating means 11 in response to the position detecting means 9 so that the magnetic head 1 is normally in the retracted position, and the magnetic head 1 is in the operative position when the bankbook 90 is substantially within the magnetic data processing position.

Figure 4:
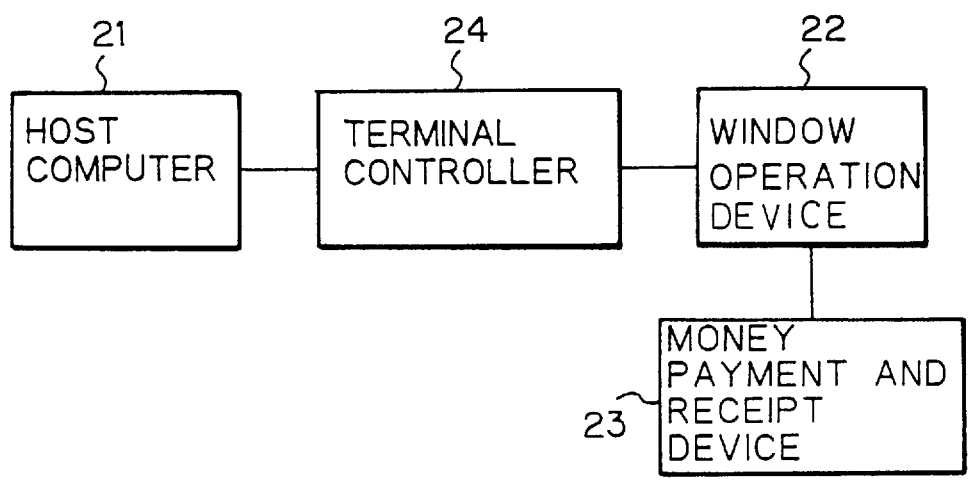
FIG. 4 is a block diagram of a bankbook management system of a financial institution.

FIG. 4 shows a bankbook management system of a financial institution such as a bank. The system comprises a host computer 21, a window operation device 22 including a money payment and receipt device 23, and a terminal controller 24 for the communication between the host computer 21 and the window operation device 22. The host computer 21 is arranged in a trade control center storing a ledger for trade data such as a bank account number and money trading records. The window operation device 22 is arranged at a customer window in a financial institution for delivering or receiving money. When data is delivered to the host computer, data is renewed in the host computer 21. The renewed data is transferred to the window operation device 22, and is printed to the bankbook 90 in the form of normal printing as well as in the form of magnetic data.

Figure 5:
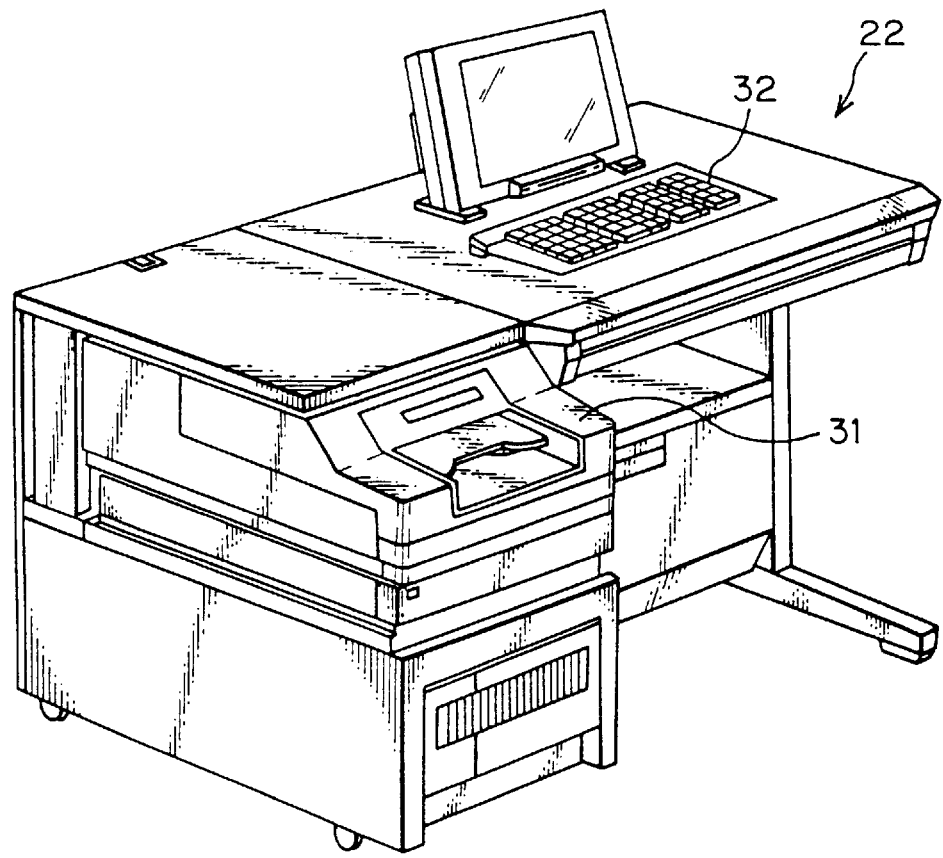
FIG. 5 is a perspective view of the window operation device of FIG. 4.
Figure 6:
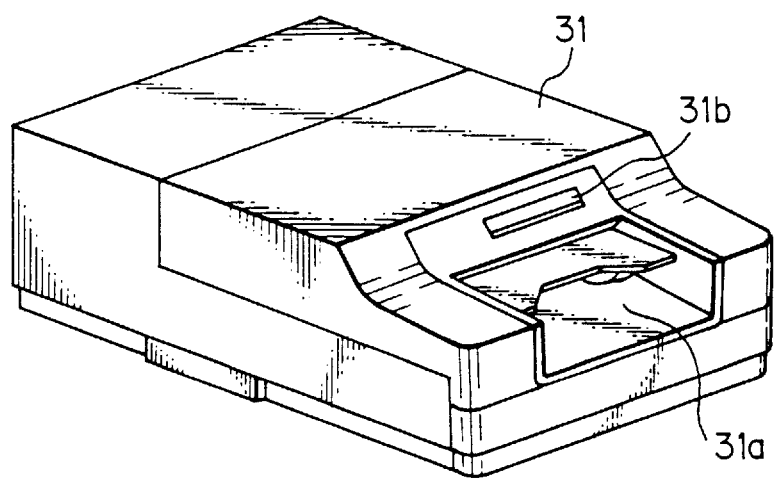
FIG. 6 is a perspective view of the bankbook handling device of FIG. 5.

FIG. 5 shows an appearance of the window operation device 22 which includes a bankbook handling device 31 and a keyboard 32 for inputting necessary data, and FIG. 6 shows an appearance of the bankbook handling device 31. The bankbook handling device 31 has a slot 31*a* for inserting and ejecting the bankbook 90 and a slot 31*b* for inserting and ejecting a form or slip. The bankbook handling device 31 has, for example, the width of 400 mm, the depth of 635 mm, and the height of 227 mm. An operator can insert a bankbook 90 which the operator received from a customer into the slot 31*a* for making a deposit, withdrawing money, or making an entry of record in the bankbook 90.

Figure 7:
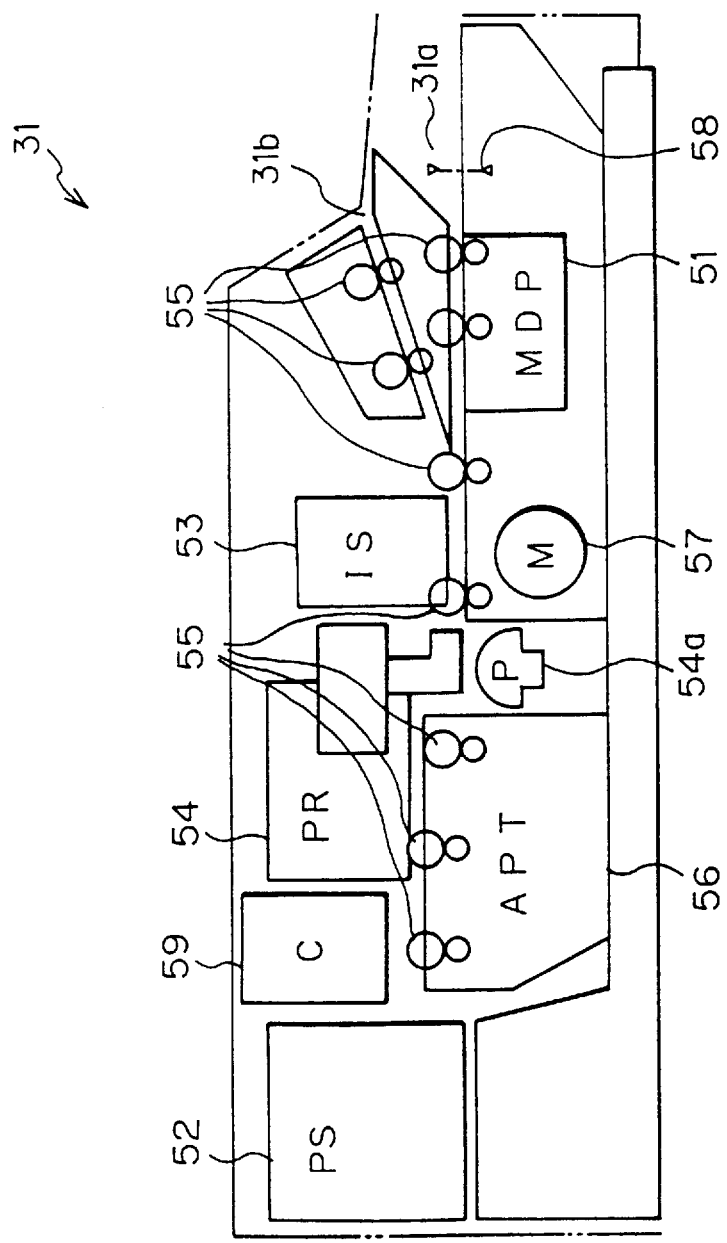
FIG. 7 is a cross-sectional view of the bankbook handling device of FIG. 6.

FIG. 7 shows the inside of the bankbook handling device 31. The bankbook handling device 31 includes a magnetic data processing device 51 for reading and writing magnetic data from and to the magnetic recording stripe 90M of the bankbook 90, when the bankbook 90 is in a magnetic data processing position, as described with reference to FIGS. 1 to 3. The magnetic data processing device 51 is further described in greater detail with reference to FIGS. 8 to 16.

In FIG. 7, a power source (PS) 52 supplies voltage to several parts of the bankbook handling device 31. An image sensor (IS) 53 detects marks indicating lines and pages of the bankbook 90. A printer (PR) 54 with a platen (P) 54*a* prints letters to the bankbook 90. Conveying rollers 55 convey the bankbook 90. An auto page turning device (APT) 56 is arranged to turn pages of the bankbook 90. A motor 57 actuate the rollers 55. The drive and pinch rollers in FIGS. 1 and 2 may be a part of the conveying rollers 55, and the motor 57 may be the actuator 8. A medium identification sensor 58 is arranged near the slots 31*a* and 31*b* to detect whether the bankbook 90 or a form is inserted, based on the width of the inserted object. A controller (C) 59 controls the parts of the bankbook handling device 31.

Figure 8:
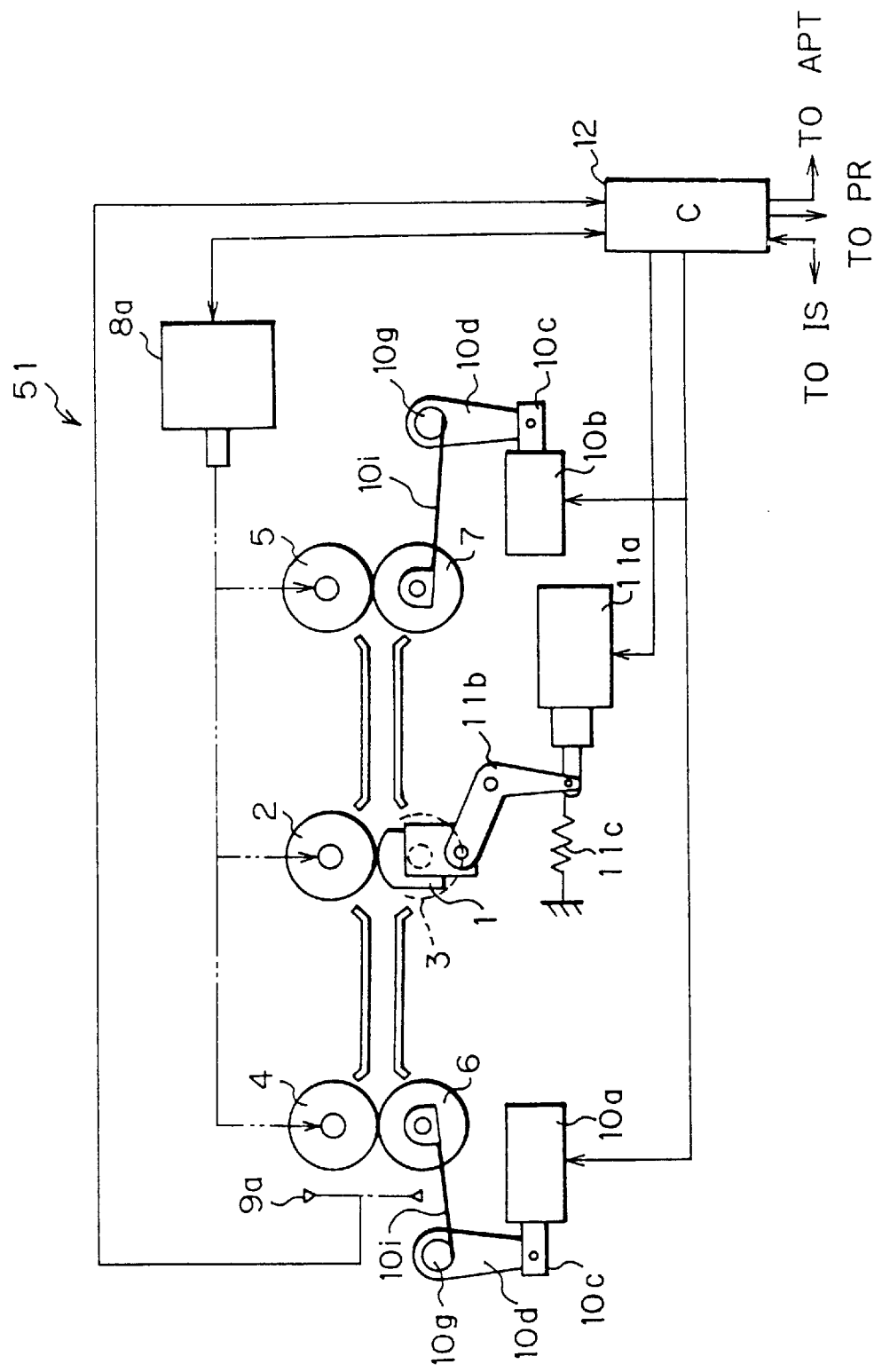
FIG. 8 is a cross-sectional view of the magnetic data processing device of FIG. 7.

FIG. 8 shows the inside of the magnetic data processing device 51. Identical reference numerals are given to elements similar to those of FIGS. 1 and 2. That is, the magnetic data processing device 51 comprises a magnetic head 1, the first row of drive and pinch rollers 2 and 3, the second row of drive and pinch rollers 4 and 6, the third row of drive and pinch rollers 5 and 7, the actuator 8 comprising a pulse motor 8*a* for rotationally actuating the drive rollers 2, 4 and 5, pressure regulating means 10 comprising magnetic actuators 10*a* and 10*b* to move the pinch roller 6 and 7 relative to the drive rollers 4 and 5, and the position regulating means 11 comprising a magnetic actuator 11*a*. The controller (C) 12 controls the magnetic actuators 10*a*, 10*b* and 11*a*. The position detecting means 9 comprises a photoelectric sensor 9*a* comprising a light emitting element and a light receiving element, the photoelectric sensor 9*a* being arranged at a position outside the second and third conveying rollers. In the embodiment, the bankbook 90 is inserted into the magnetic data processing device 51 from the right in FIG. 8, and the sensor 9*a* is arranged at a position slightly beyond the third row of the drive and pinch rollers 4 and 6.

Figure 11:
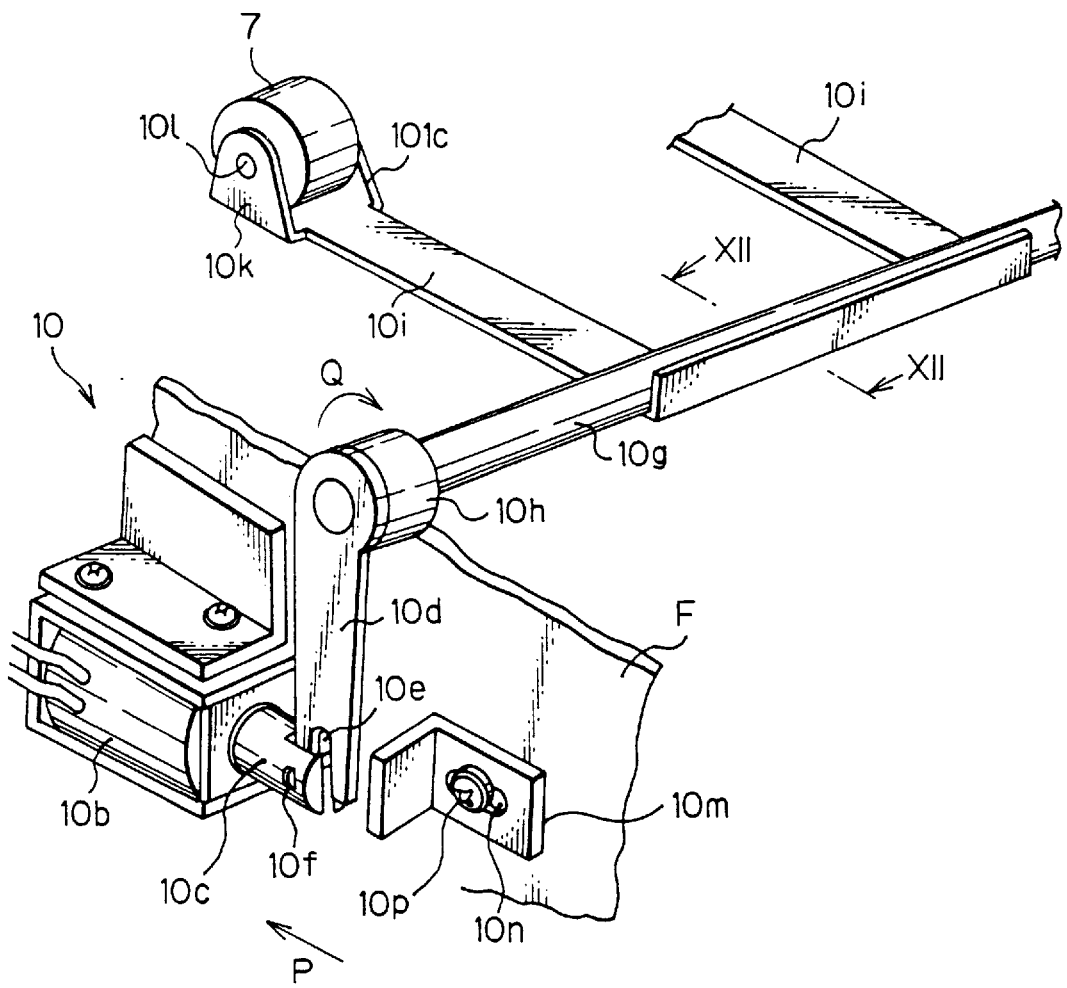
FIG. 11 is a perspective view of the pressure regulating mechanism.
Figure 12:
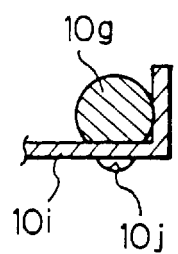
FIG. 12 is a cross-sectional view taken along the line XII—XII in FIG. 11.

In FIGS. 8 and 11, each of the magnetic actuators 10*a* and 10*b* comprises a solenoid-operated plunger 10*c* having a pin 10*f* fixed thereto. A lever 10*d* having a slot 10*e* is engaged at one end thereof with the plunger 10*c* and a shaft 10*g* is fixed to the other end of the lever 10*d*. The pin 10*f* of the plunger 10*c* is inserted in the slot 10*e* of the lever 10*d*, so that the linear motion P of the plunger 10*c* is transferred to the pivotal motion Q of the lever 10*d*. The shaft 10*g* is rotatably supported by a frame F via a bearing 10*h* and has two resilient support plates 10*i* with an intermediate portion interconnect two resilient support plates 10*i*. The shaft log has a flat portion at the bottom thereof, as shown in FIG. 12, whereby the resilient support plates 10*i* rest against the flat portion of the shaft 10*g* and are fastened to the latter by fastening screws 10*j*. Each of the resilient support plates 10*i* has upstanding walls 10*k* between which a pin 101 extends. The pinch roller 6 to 7 is rotatably supported by the pin 101. A stopper 10*m* is adjustably arranged to stop the plunger 10*c* so as to provide a desired stroke position.

Figure 13:
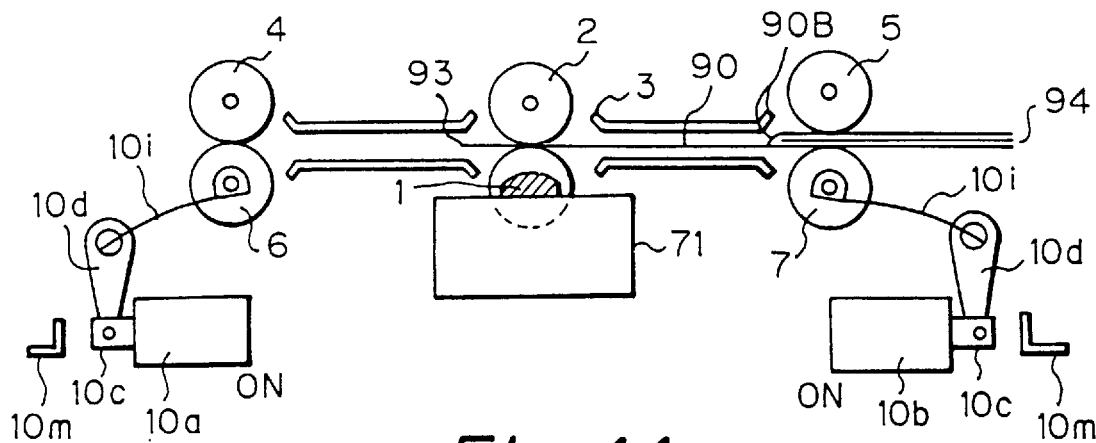
FIG. 13 is a diagrammatic elevational view, similar to FIG. 1, of the magnetic data processing device, illustrating the initial stage of the bankbook insertion.

In FIG. 13, the magnetic actuators 10*a* and 10*b* are switched on, when the bankbook 90 is in a normal position, i.e., when the bankbook 90 is out of the magnetic data processing position. Therefore, each of the solenoid-operated plungers 10c is pulled in its casing under the action of the solenoid (not shown), and the lever 10d pivotably moves so that the pinch roller 6 or 7 is brought into contact with the corresponding drive roller 4 or 5. The resilient support plate 10i is sufficiently deformed to apply the pinching pressure between the drive and pinch rollers 4 and 6, or 5 and 7.

Figure 14:
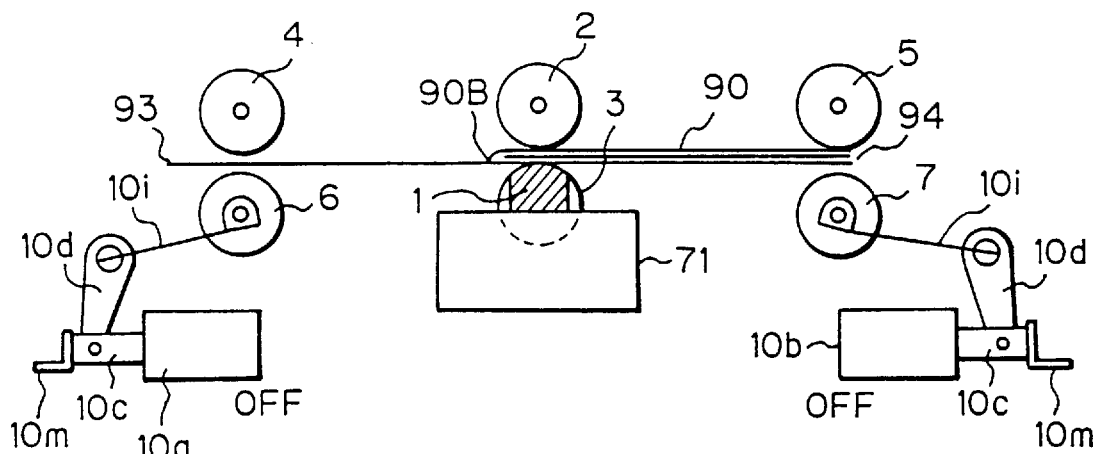
FIG. 14 is a diagrammatic elevational view of the magnetic data processing device at the subsequent stage of FIG. 13.

In FIG. 14, the magnetic actuators 10a and 10b are switched off, when the bankbook 90 is in the magnetic data processing position, i.e., when the bankbook 90 is in a position where the magnetic stripe 90M of the bankbook 90 overlaps the magnetic head 1. Thus, each of the solenoid-operated plungers 10c projects from its casing, and the lever 10d correspondingly moves so that the pinch rollers 6 and 7 move away from the respective drive rollers 4 and 5. In this case, the pinching pressure between the drive and pinch rollers 4 and 6, and 5 and 7 is reduced to zero.

Figure 15:
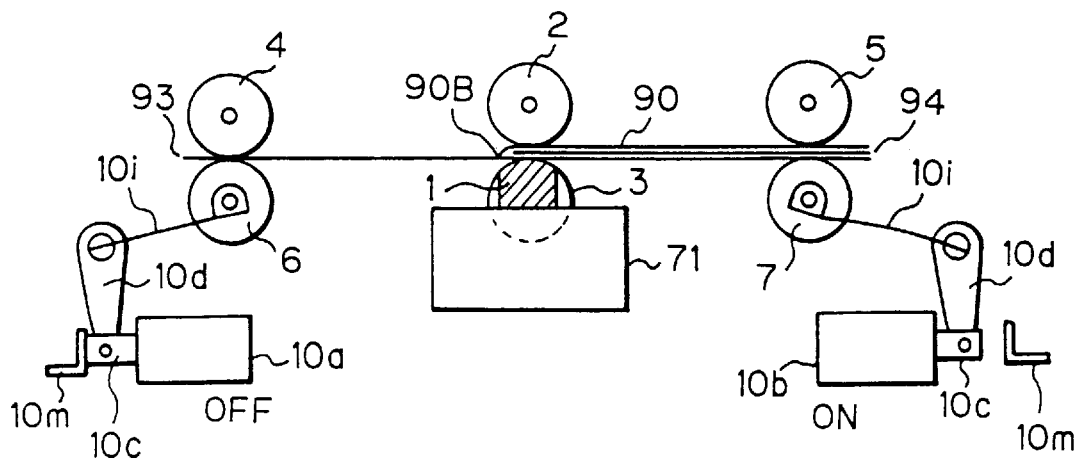
FIG. 15 is a diagrammatic elevational view of the magnetic data processing device at a stage corresponding to the stage of FIG. 14, but the pinch rollers being differently controlled from those of FIG. 14.

FIG. 15 shows an example similar to that of FIG. 14. Initially, the magnetic actuators 10a and 10b are switched on when the bankbook 90 is out of the magnetic data processing position, as described with reference to FIG. 13. Then, when the bankbook 90 is in the magnetic data processing position, one of the magnetic actuators 10a is switched off, but the other magnetic actuator 10b is maintained switched on. Accordingly, it is possible to reduce the pinching pressure between the drive and pinch rollers 4 and 6, and to maintain the pinching pressure between the drive and pinch rollers 5 and 7 unchanged.

In addition, the stopper 10m for the magnetic actuator 10a is adjusted so that the pinch roller 6 is not completely separated from the drive roller 4 and the reduced elastic force of the resilient plate 10i is applied to the pinch roller 6. Accordingly, the pinching pressure between the drive and pinch rollers 4 and 6 is reduced to a value lower than the initial pinching pressure. The pinching pressure is not zero in this case. It will be understood that it is possible to adjust the stopper 10m for the magnetic actuator 10b separately from the stopper 10i for the magnetic actuator 10a and to switch the magnetic actuators 10a and 10b off when the bankbook 90 is in the magnetic data processing position. In this case, the pinching pressures are reduced to different values from each other.

Figure 9:
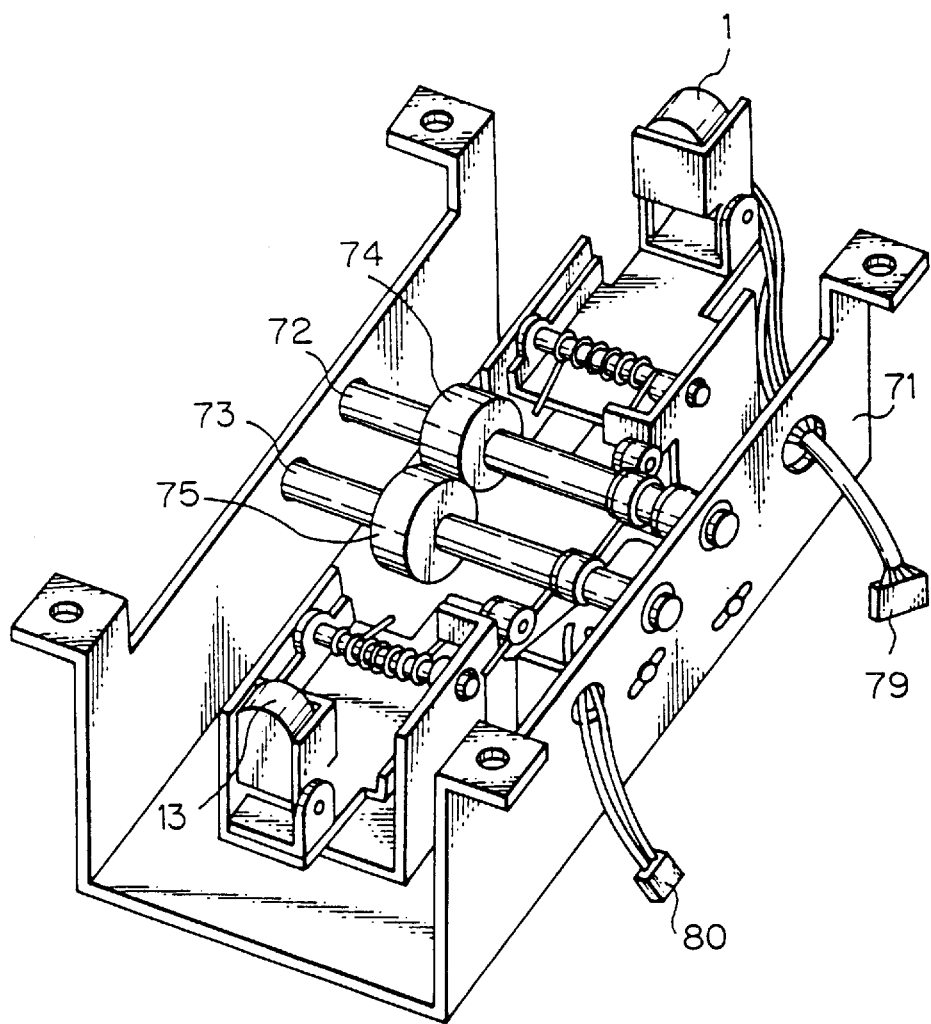
FIG. 9 is a perspective view of the magnetic head unit.
Figure 10:
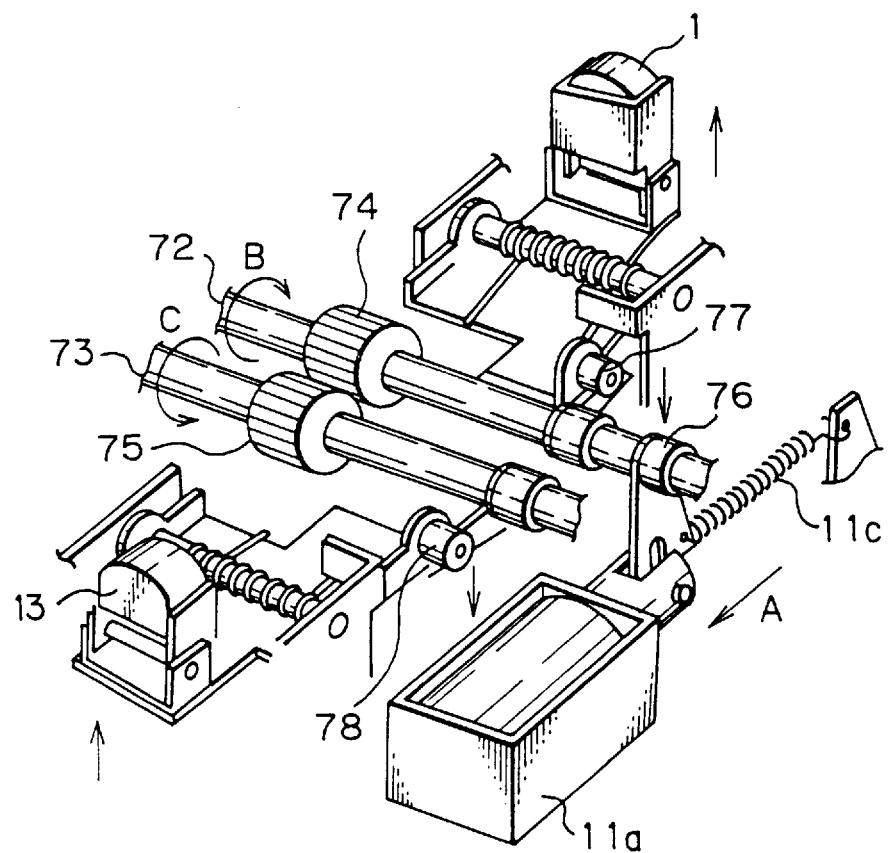
FIG. 10 is a perspective view of the magnetic head unit of FIG. 9, with head frame removed.

FIGS. 9 and 10 show the magnetic head unit including a unit frame 71 to which the magnetic head 1 and the dummy head 13 are mounted. The dummy head 13 has a configuration and a coefficient of friction similar to those of the magnetic head 1. The dummy head 13 is mounted to the unit frame 71 at such a position relative to the magnetic head 1 that the friction between the dummy head 13 and the bankbook 90 balances the friction between the magnetic head 1 and the bankbook 90. The unit frame 71 has a configuration to surround the magnetic head 1 and the dummy head 13. The magnetic actuator 11a is housed in the unit frame 71. There are a magnetic head connector 79 having a cable extending from the magnetic head 1, and a solenoid connector 80 having a cable extending from the magnetic actuator 11a.

Parallel shafts 72 and 73 are rotatably arranged between the opposite walls of the unit frame 71. The magnetic head 1 is arranged on one side of the parallel shafts 72 and 73 and the dummy head 13 is arranged on the other side of the parallel shafts 72 and 73. The shaft 72 has a gear 74 fixed thereto and the shaft 73 has a gear 75 fixed thereto, the gears 74 and 75 being intermeshing.

A lever 76 extends from the plunger of the magnetic actuator 11a to the shaft 72, and a lever 77 extends from the shaft 72 to the magnetic head 1 via a further lever. (The levers 76 and 77 are substituted by a single lever 11b in FIG. 8). A lever 78 extends from the shaft 73 to the dummy head 13 via a further lever. In the operation of the magnetic actuator 11a, the plunger is pulled in the direction A, and the shaft 72 rotates in the direction B. The lever 77 then rotates downwardly, and the magnetic head 1 rotates upwardly. The shaft 73 connected to the shaft 72 by gears 74 and 75 rotates in the direction C. The lever 78 then rotates downwardly, and the dummy head 13 rotates upwardly. In this manner, the dummy head 13 is moved simultaneously with the magnetic head 1, so that the magnetic head 1 and the dummy head 13 are normally in the retracted position in which they are not engaged with the bankbook 90, and the magnetic head 1 and the dummy head 13 are in the operative position when the bankbook 90 is substantially within the magnetic data processing position.

FIGS. 16A to 16K show the sequential operations of the magnetic data processing device 51 and the magnetic data handling device 31.

Figure 16A:
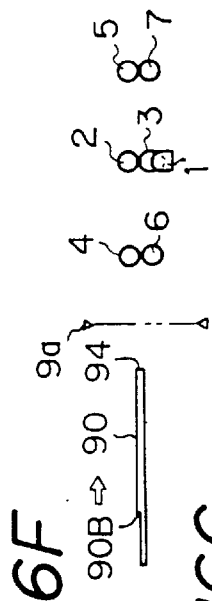
FIGS. 16A to 16K are diagrammatic views illustrating the sequential operations of the magnetic data processing device.

In FIG. 16A, the bankbook 90 is inserted in the magnetic data handling device 31 and conveyed to the magnetic data processing device 51. The bankbook 90 passes through the drive and pinch rollers 5–7, 2–3, and 4–6. The pinch rollers 3, 6, and 7 are pressed to the respective drive rollers 2, 4, and 5. The magnetic head 1 and the dummy head 13 are in the retracted position.

Figure 16B:
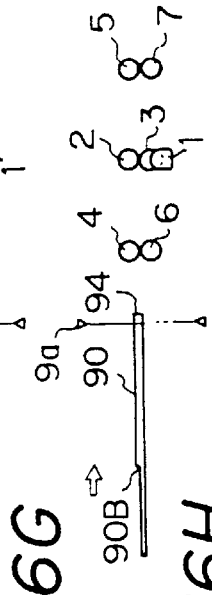

The leading edge 93 of the bankbook 90 may reach the position detecting sensor 9a, as shown in FIG. 16B. The sensor 9a is arranged in such a position that the leading edge 93 of the bankbook 90 reaches the sensor 9a, just after the leading edge (the inner binding portion in this case) of the page of the bankbook 90 having the magnetic stripe 90B passes through the second row of drive and pinch rollers 2 and 3.

If the bankbook conveying speed is lower than 20 cm/s, the fluctuation of the conveying speed may be relatively small, but if the bankbook conveying speed is higher than 20 cm/s, the fluctuation of the conveying speed may become large, at the occasions when the leading edge of the bankbook moves into a gap between the drive and pinch rollers, when the trailing edge of the bankbook leaves the drive and pinch rollers, and when the bankbook collides against or frictionally engages with the magnetic head. Therefore, it is necessary to control the pinching pressure and/or the position of the magnetic head 1.

Figure 16C:
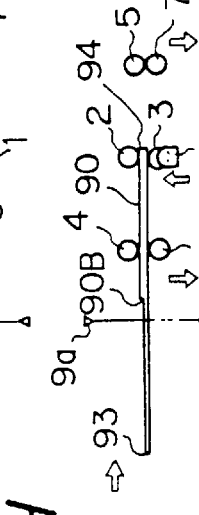

Therefore, just after the leading edge (inner binding portion) of the page of the bankbook 90 passes through the driving and pinch rollers 2 and 3, the pinch rollers 6 and 7 are moved to reduce the pinching pressure and the magnetic head and the dummy head 13 are brought into the operating position. Therefore, the magnetic head 1 can read magnetic data of the magnetic stripe 90M of the bankbook 90, as shown in FIG. 16C.

Figure 16D:
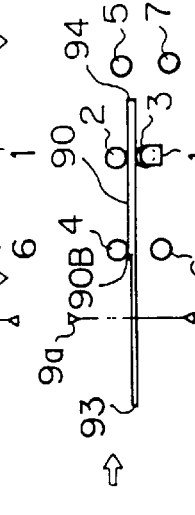

When the reading of the magnetic data from the magnetic strip 90M is completed, the pinch rollers 6 and 7 are returned to the initial position and the magnetic head 1 and the dummy head 13 are returned to the retracted position, as shown in FIG. 16D.

Figure 16E:
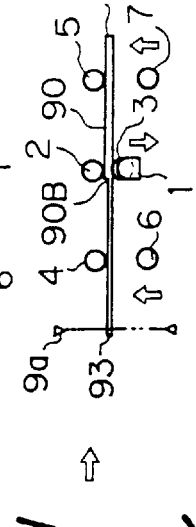
Figure 16F:
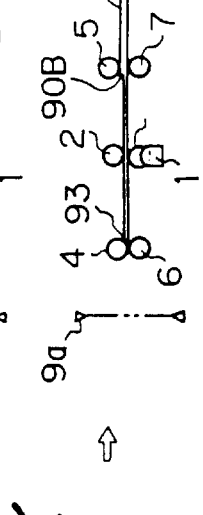
Figure 16G:
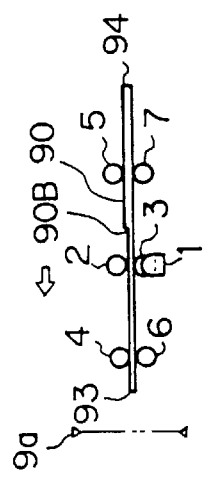
Figure 16H:
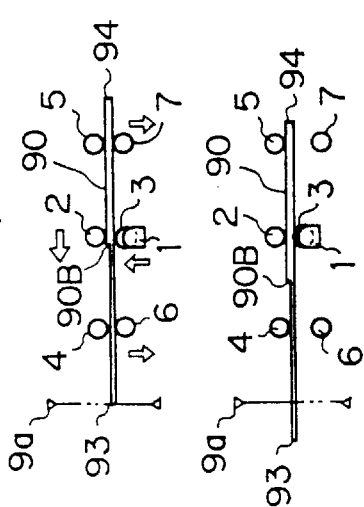
Figure 16I:
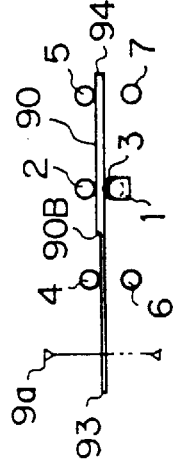

The bankbook 90 is further conveyed to the printer 54 (FIG. 7), as shown in FIG. 16E. After printing, the bankbook 90 is conveyed in reverse, as shown in FIG. 16F. The sensor 9a detects the leading edge 94 of the bankbook 90, as shown in FIG. 16G. In this case, the controller 12 calculates the time when the leading edge 94 of the page of the bankbook 90 having the magnetic stripe 90M passes through the magnetic head 1 after the sensor 9a detects the leading edge of the bankbook 90. The controller 12 thus counts the pulse of the pulse motor 8a in correspondence with the calculated time. Thus the pinch rollers 6 and 7 are moved, whereby the pinching pressure between the pinch and drive rollers 4–6, and 5–7 is reduced during a time period from the calculated time to the completion of the magnetic data processing, i.e., writing magnetic data to the magnetic stripe 90B of the bankbook, as shown in FIGS. 16H and 16I. Also, the magnetic head 1 and the dummy head 13 are moved from the retracted position to the operative position when the magnetic stripe 90M is in the magnetic data processing position.

Figure 16J:
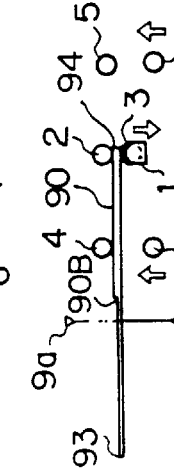
Figure 16K:
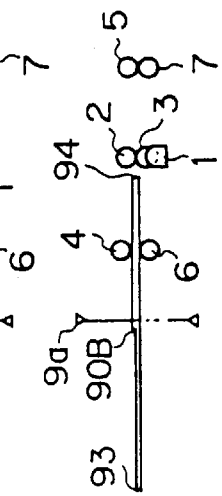

The pinch rollers 6 and 7, the magnetic head 1 and the dummy head 13 are returned to the initial positions when the writing of the magnetic data to the magnetic stripe 90M is completed, as shown in FIGS. 16J and 16K. The bankbook 90 is then ejected from the device.

FIGS. 17A to 17D are views illustrating a flow chart for controlling the magnetic data processing device 51 and the printer 54. This will fundamentally conform the operations of FIGS. 16A to 16K.

Figure 17A:
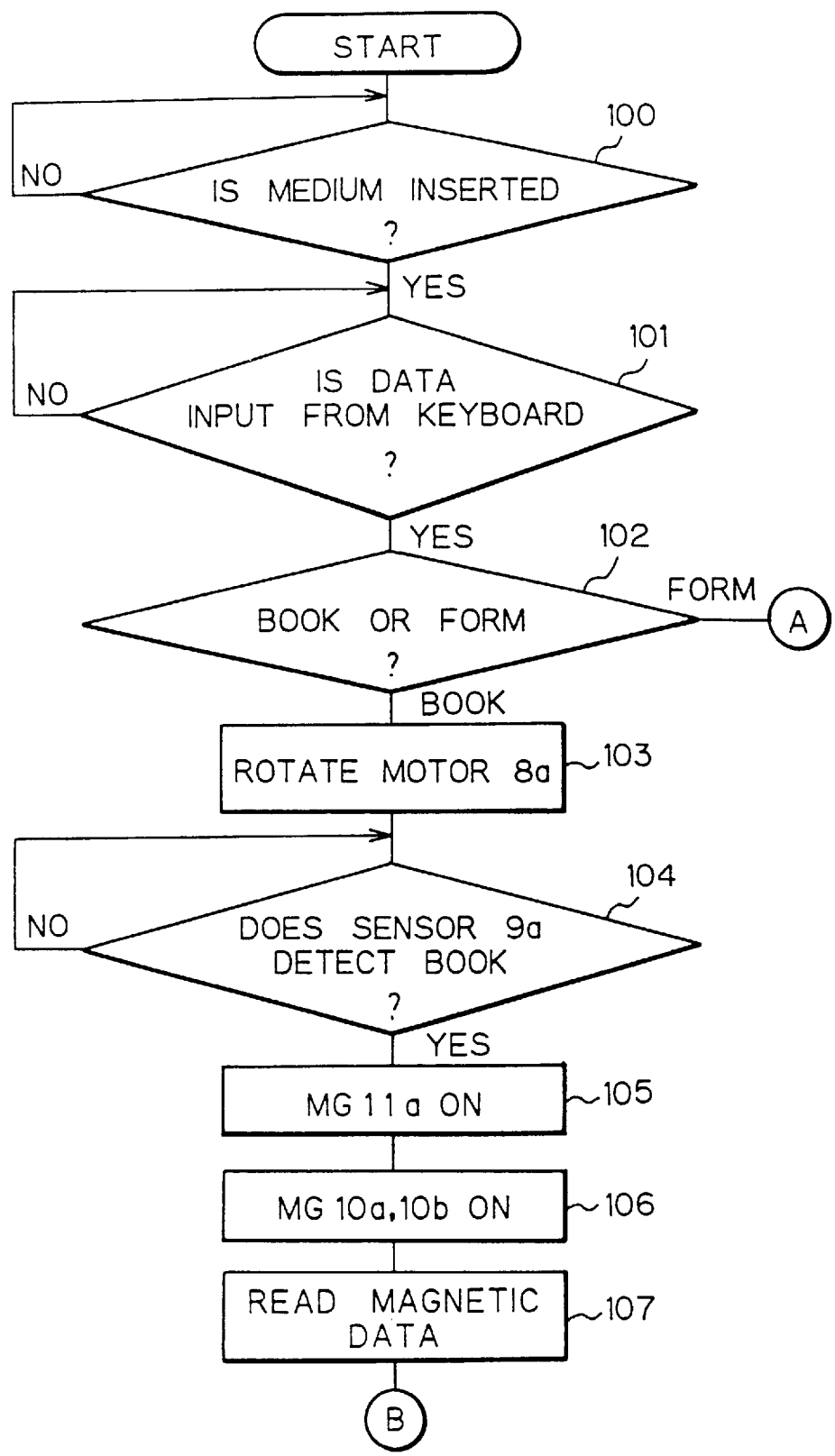
FIGS. 17A to 17D are views illustrating a flow chart for controlling the magnetic data processing device and the printer.
Figure 17B:
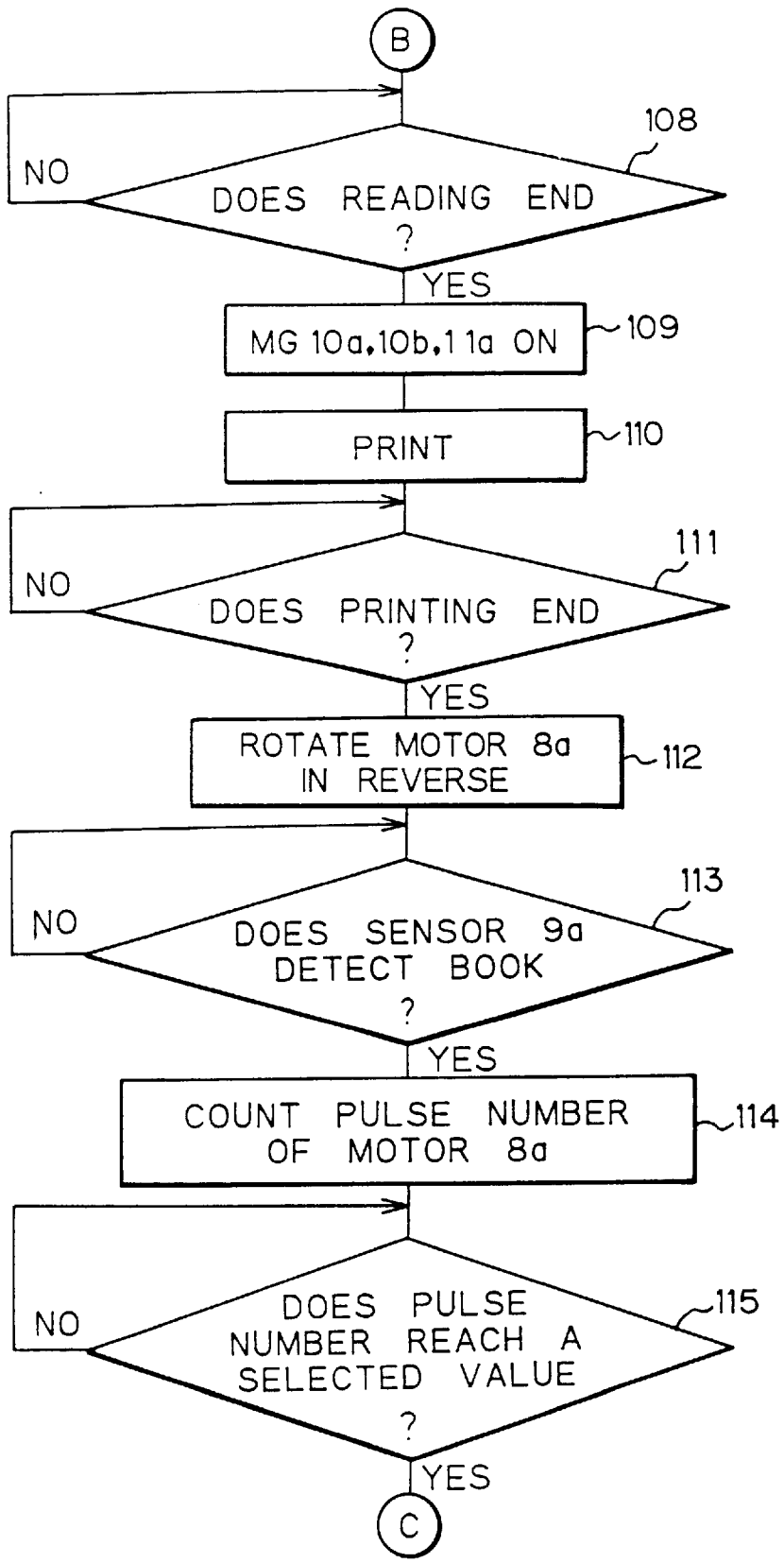
Figure 17C:
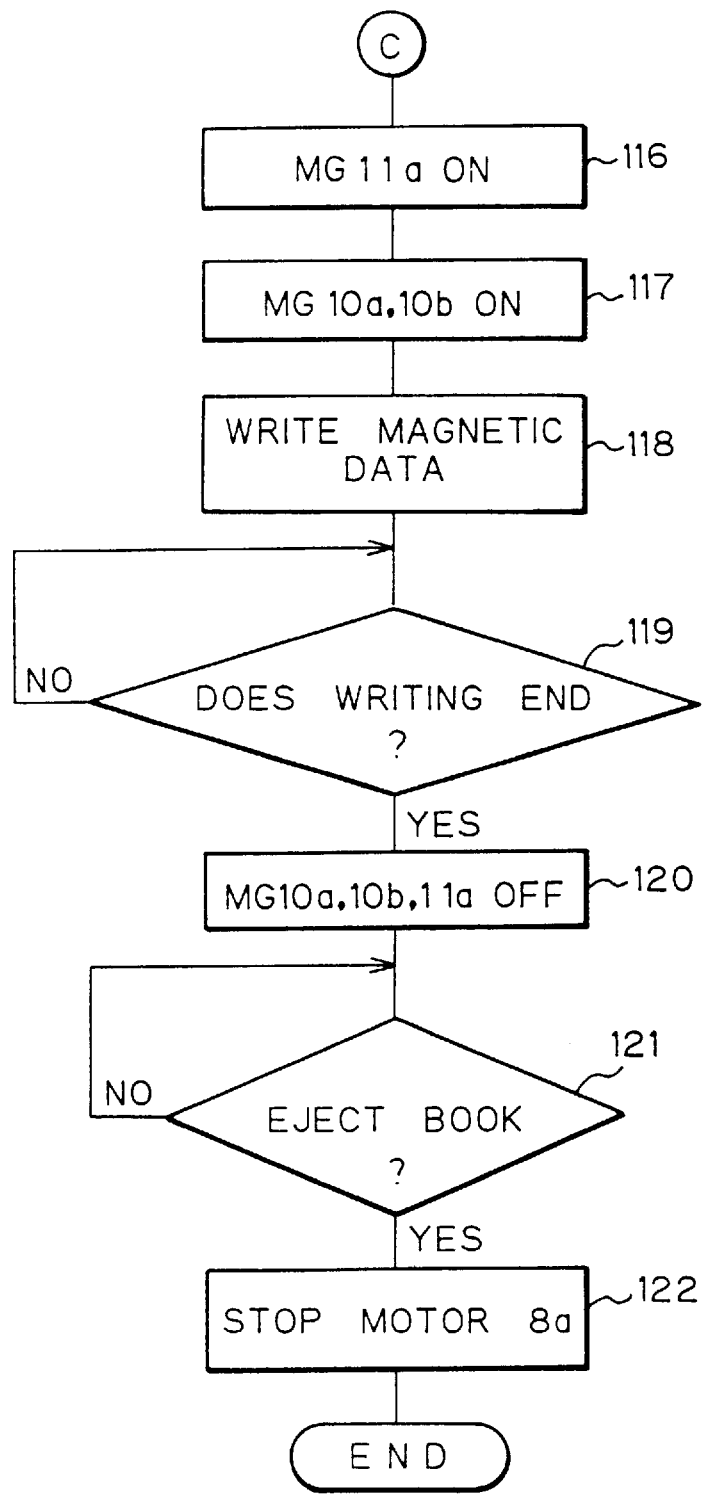

At step 100 of FIG. 17A, it is determined whether or not a medium is inserted in the slot 31a or 31b of the magnetic data handling device 31. At step 101, it is determined whether or not data is input from the keyboard 32. At step 102 of FIG. 17A, it is determined whether or not the inserted medium is a bankbook or a form (slip), by the signal from the medium identification sensor 58 arranged near the slots 31a and 31b. If a form is inserted, the program goes to step 123 of FIG. 17D. If a bankbook 90 is inserted, the program goes to step 103, to rotate the pulse motor 8a to convey the bankbook 90 to the magnetic data processing device 51.

At step 104, it is determined whether or not the sensor 9a detects the leading edge 93 of the bankbook 90, the latter being detected just after the leading edge (the inner binding portion) of the page of the bankbook 90 including the magnetic stripe 90M passes through the second row of drive and pinch rollers 2 and 3.

The magnetic head 1 and the dummy head 13 are moved from the retracted position to the operative position by switching the magnetic actuator (MG) 11a on at step 105, and the pinch rollers 6 and 7 are moved to reduce the pinching pressure by switching the magnetic actuators (MG) 10a and 10b on at step 106. At step 107, the reading of magnetic data of the magnetic stripe 90M is carried out. The program then goes to step 108 of FIG. 17B, and it is determined whether or not the reading is completed. When the reading is completed, the pinch rollers 6 and 7, the magnetic head 1, and the dummy head 13 are returned to the initial positions, by switching the magnetic actuators 10a, 10b and 11a off at step 109. The bankbook 90 is further conveyed to the printer 54, and the printing is carried out at step 110. The auto page turning device (APT) 56 turns pages of the bankbook 90 if necessary, and the image sensor (IS) 53 detects lines and pages of the bankbook 90.

When the printing is completed (step 111), the pulse motor 8a is rotated in reverse to convey the bankbook 90 to the magnetic data processing device 51 (step 112). At step 113, it is determined whether or not the sensor 9a detects the leading edge 94 of the bankbook 90. The controller 12 then starts to count the number of pluses of the pulse motor 8a (step 114) until the leading edge 94 of the page of the bankbook 90 having the magnetic stripe 90M passes through the drive and pinch rollers 2 and 3 (step 115). The program goes to step 116 of FIG. 17C, to switch the magnetic actuator 11a on to move the magnetic head 1 and the dummy head 13 from the retracted position to the operative position (step 116), and to switch the magnetic actuators 10a and 10b on (step 117) to move the pinch rollers 6 and 7 to reduce the pinching pressure.

The writing of magnetic data to the magnetic stripe 90M is then carried out (step 118), and the pinch rollers 6 and 7, and the magnetic head 1 and the dummy head 13 are returned to the initial positions, when the writing is completed (steps 119, 120). The bankbook 90 is further conveyed to the inlet 31a, and it is determined whether or not the bankbook 90 is ejected (step 121). The pulse motor 8a is then stopped (step 122).

Figure 17D:
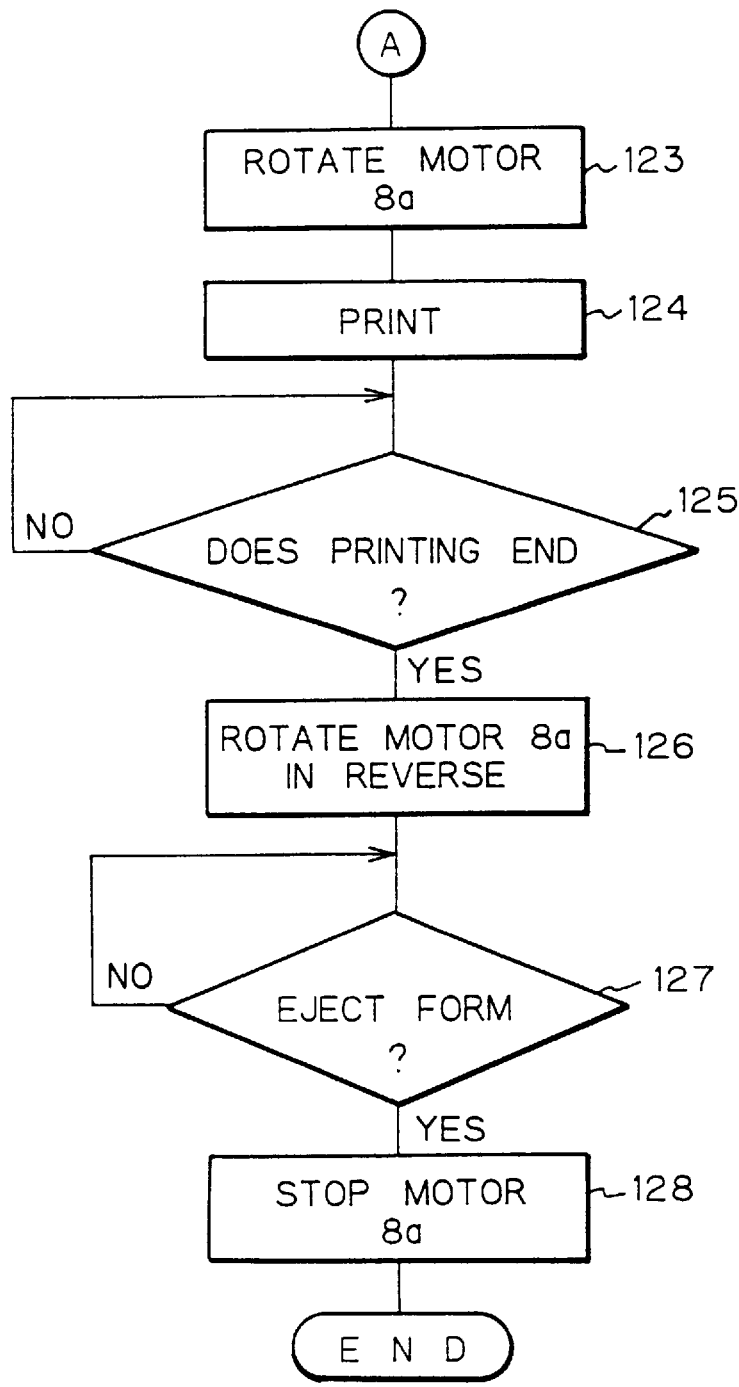

The program goes to step 123 of FIG. 17D, when a form is detected (step 102). The pulse motor 8a is rotated to convey the form to the printer 54, through the magnetic data processing device 51. The printing is thus carried out (step 124). When the printing is completed (step 125), the pulse motor 8a is rotated in reverse (step 126). The form is conveyed to the inlet 31b through the magnetic data processing device 51, and it is determined whether or not the form is ejected (step 127). The pulse motor 8a is then stopped (step 128).

Figure 18:
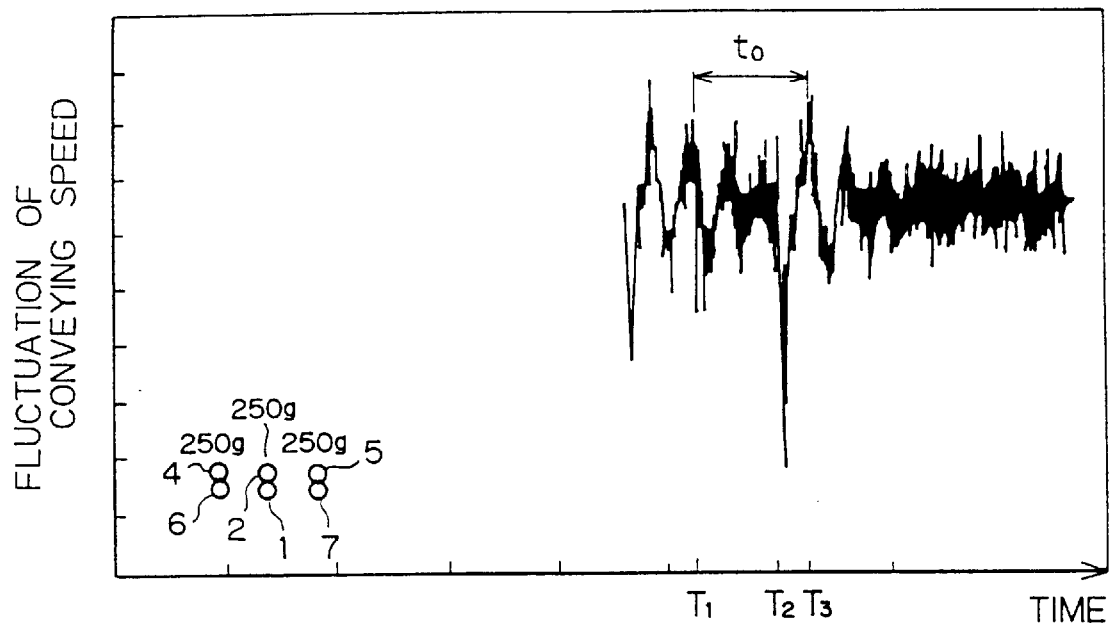
FIG. 18 is a view illustrating a fluctuation of the conveying speed of the bankbook where the pinching pressure between drive and pinch rollers is maintained constant.

FIG. 18 shows a fluctuation of the conveying speed of the bankbook 90 where the pinching pressure between drive and pinch rollers 2–3, 4–6, and 5–7 is maintained constant (250 g/cm$^2$). That is, the pinching pressure is not reduced when the bankbook 90 is in the magnetic data processing position. The conveying speed is measured at small time intervals, and the fluctuation of the conveying speed is plotted relative to the average value. The leading edge of the magnetic stripe 90M overlaps the magnetic head 1 at a point $T_1$, and the trailing edge of the magnetic stripe 90M overlaps the magnetic head 1 at a point $T_3$. Accordingly, the magnetic head 1 can read/write magnetic data of the magnetic stripe 90M during a time period $t_0$. The leading edge (inner binding portion 90B) of the page of the bankbook 90 having the magnetic stripe 90M passes through the drive and pinch rollers 4 and 6 at a point $T_2$. It can be seen that the fluctuation of the conveying speed of the bankbook 90 is especially high at the point $T_2$. This is because a shock occurs when the leading edge (inner binding portion 90B) of the page of the bankbook 90 having the magnetic stripe 90M passes through the drive and pinch rollers 4 and 6.

Figure 19:
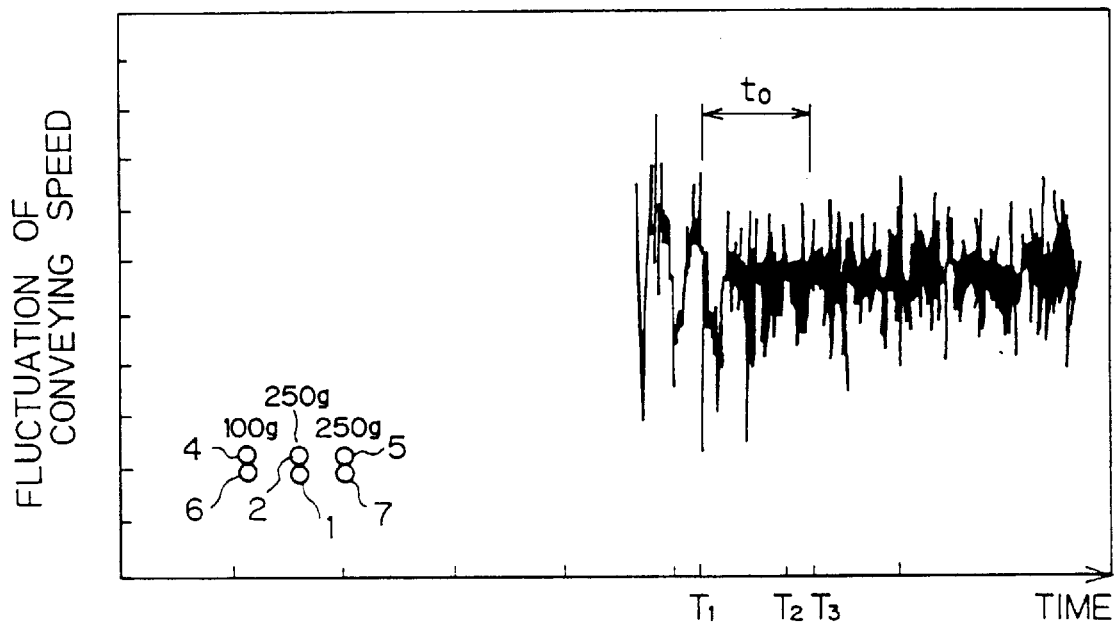
FIG. 19 is a view illustrating a fluctuation of the conveying speed of the bankbook where the pinching pressure between drive and pinch rollers is reduced when the bankbook is in the magnetic data processing position.

FIG. 19 shows a fluctuation of the conveying speed of the bankbook 90 where the pinching pressure between drive and pinch rollers is reduced when the bankbook 90 is in the magnetic data processing position. In this embodiment, the pinching pressure between drive and pinch rollers 2–3, and 5–7 is maintained constant (250 g/cm$^2$), but the pinching pressure between drive and pinch rollers 4 and 6 is reduced from 250 g/cm$^2$ to 100 g/cm$^2$ when the bankbook 90 is in the magnetic data processing position. This corresponds to the example of FIG. 15. The points $T_1$, $T_2$ and $T_3$ are identical to those of FIG. 18. It can be seen that the fluctuation of the conveying speed of the bankbook 90 at the point $T_2$ is mitigated according to the present invention.

As explained in greater detail, by reducing the pinching pressure between at least one pinch roller and an associated drive roller, according to the present invention, it is possible to reduce the fluctuation of the conveying speed of the book-type magnetic recording medium and thus to process magnetic data in a stable condition even when the book-type magnetic recording medium is conveyed at high speed.

Also, by moving the magnetic head between a retracted position and an operative position, according to the present invention, it is possible to reduce the fluctuation of the conveying speed of the book-type magnetic recording medium and thus to process magnetic data in a stable condition even when the book-type magnetic recording medium is conveyed at high speed. It is also possible to obtain a prolonged operational life of the magnetic head. Also, when a thinner medium than a book-type magnetic recording medium is conveyed through the magnetic data processing device, such medium can pass through the magnetic data processing device without colliding against the magnetic head.

In addition, by arranging a dummy head having a configuration similar to that of the magnetic head such that the friction between the dummy head and the magnetic recording medium balances the friction between the magnetic head and the book-type magnetic recording medium, the position of the book-type magnetic recording medium in the path is not slanted, and it is possible to exactly process magnetic data and exactly print the letters.

Also, the magnetic head and the dummy head can be moved simultaneously from the retracted position to the operative position, and a possibility of the collision of the medium against the magnetic head is reduced.

I claim:

1. A magnetic data processing head unit for a planar magnetic recording medium, said unit comprising:
   a frame defining a conveying path along which the magnetic recording medium is conveyed;
   a magnetic head mounted to said frame and movable from a retracted position to an operative position, relative to the path, for reading and writing data to and from the magnetic recording medium being conveyed along said path, in said operative position thereof said magnetic head engaging said magnetic recording medium with a first frictional force; and
   a dummy head mounted to said frame and movable from a retracted position to an operative position relative to said path and, in said operative position, engaging said magnetic recording medium with a second frictional force therebetween substantially equal to said first frictional force to balance the first frictional force;
   an operator for moving said dummy head simultaneously with said magnetic head between said respective operative positions and said respective retracted positions thereof, wherein, by simultaneously moving the magnetic head and the dummy head, a load in a direction perpendicular to the conveying direction is balanced when the magnetic head is positioned either at the operative position or the retracted position;
   wherein said magnetic head and said dummy head are arranged at transversely opposite end regions on the conveying path, and
   wherein said operator comprises a driver arranged centrally between said magnetic head and said dummy head and is rotatable about an axis parallel to said conveying path; and
   movement transferring elements symmetrically extending from said driver to said magnetic head and said dummy head.

2. A magnetic data processing device according to claim 1, wherein each first, second, and third conveyer comprises two pairs of drive and pinch rollers arranged on a line perpendicular to a conveying direction of the magnetic recording medium.

3. A magnetic data processing device according to claim 1, wherein a distance between the first and second conveyers is smaller than a length of the magnetic recording medium to be conveyed, and a distance between the first and third conveyers is smaller than the length of the magnetic recording medium to be conveyed.

4. A magnetic data processing device according to claim 3, wherein the detector comprises a sensor for detecting a leading edge of the magnetic recording medium to be conveyed, and a calculator for calculating a time when the magnetic recording medium enters the magnetic data processing position.

5. A magnetic data processing device according to claim 4, wherein the sensor is arranged at a position outside a distance between the second and third conveyors.

6. A magnetic data processing device according to claim 5, wherein the magnetic recording medium can be opened to form a spread with a first sheet and a second sheet and an inner binding portion intermediate the first and second sheets, wherein, when the magnetic recording medium is opened, the magnetic recording portion extends in the first sheet, leaving margins on the first sheet at both sides of the magnetic recording portion, and wherein the calculator calculates the time when the leading edge of the first sheet passes through the magnetic head after the sensor detects the leading edge, and a pinching pressure between the at least one pinch roller and the drive roller in the second and third conveyors is reduced during a time period from the calculated time to the completion of the magnetic data processing.

7. A magnetic data processing device according to claim 1, further comprising a pressure controller for at least one of the at least one pinch rollers, and an actuator for the pinching pressure.

8. A magnetic data processing device according to claim 7, wherein the pressure controller comprises a first pressure regulating mechanism for regulating the pinching pressure between the pinch and drive rollers of the second conveyor, and a second pressure regulating mechanism for regulating the pinching pressure between the pinch and drive rollers of the third conveyer.

9. A magnetic data processing device according to claim 8, wherein each of the first and second pressure regulating mechanisms comprises a resilient support rotationally supporting each of the pinch rollers, and further comprising a second actuator controlled by the controller for moving the resilient support for regulating the pinching pressure.

10. A magnetic data processing device according to claim 9, wherein each resilient support comprises a resilient plate, and the second actuator comprises a solenoid-operated actuator.

11. A magnetic data processing device according to claim 8, wherein the pressure controller controls a pinching pressure between each pinch roller and a corresponding drive roller is a first value when a detector detects that the magnetic recording medium is outside a magnetic data processing position, and the pinching pressure between each said pinch roller and the corresponding drive roller is reduced from the first value to a second value lower than the first value, when the detector detects that the magnetic recording medium is in the magnetic data processing position.

12. A magnetic data processing device according to claim 11, wherein the second value is zero.

13. A magnetic data processing device according to claim 8, wherein a pressure controller controls the first pressure regulating mechanism so that a pinching pressure between the pinch and drive rollers in the second conveyor is a first value, when a detector detects that the magnetic recording medium is outside a magnetic data processing position, and a pinching pressure between the pinch and drive rollers in the second conveyor is reduced from the first value to a second value lower than the first value, when the detector detects that the magnetic recording medium is in the magnetic data processing position, and the pressure controller also controls the second pressure regulating mechanism so that a pinching pressure between the pinch and drive rollers in the third conveyor is a third value when the detector detects that the magnetic recording medium is outside the magnetic data processing position, and a pinching pressure between the pinch and drive rollers in the third conveyor is reduced from the third value to a fourth value lower than the third value when the detector detects that the magnetic recording medium is in the magnetic data processing position.

14. A magnetic data processing device according to claim 13, wherein the second and fourth values are zero.

15. A magnetic data processing device according to claim 13, wherein the first and third values are substantially identical to each other, and the second and fourth values are substantially identical to each other.

16. A magnetic data processing device according to claim 8, wherein the pressure controller controls the first and second pressure regulating mechanisms so that a pinching pressure between the pinch and drive rollers in the second and third conveyors is a first value when a detector detects that the magnetic recording medium is outside a magnetic data processing position, and a pinching pressure between the pinch and drive rollers in the second and third conveyors is reduced from the first value to a second value lower than the first value with a pinching pressure between the pinch and drive rollers in the first conveyor maintained unchanged when the detector that the magnetic recording medium is in the magnetic data processing position.

17. A magnetic data processing device according to claim 13, wherein the head position operator and the pressure regulator are simultaneously controlled by the pressure controller.

18. A magnetic data processing device according to claim 1, wherein the magnetic recording medium is conveyed along a first line, and the magnetic head and the dummy are arranged on a second line which is perpendicular to the first line.

19. A magnetic data processing device according to claim 1, further comprising:

a detector for detecting the position of the magnetic recording medium;

a head position operator arranged in cooperation with the magnetic head and the dummy head to simultaneously move the magnetic head and the dummy head between the operative positions in which the magnetic head and the dummy head are in contact with the magnetic recording medium and the retracted positions in which the magnetic head and the dummy head are retracted from the path of the magnetic recording medium; and a controller for controlling the head position operator in response to the detector so that the magnetic head and the dummy head are normally in the retracted position, and the magnetic head and the dummy head are in the operative positions when the magnetic recording medium is substantially within a magnetic data processing position.

20. A magnetic data processing device according to claim 19, wherein the head position operator comprises a support rotationally supporting the magnetic head and the dummy head, and an actuator controlled by the controller for moving the support for regulating the magnetic head and the dummy head.

21. A magnetic data processing device according to claim 1, further comprising:

a first conveyor arranged near the magnetic head and including at least one pair of drive and pinch rollers for pinching the magnetic recording medium therebetween to convey the magnetic recording medium;

a second conveyor arranged on one side of the first conveyor and including at least one pair of drive and pinch rollers for pinching the magnetic recording medium therebetween to convey the magnetic recording medium to and from the first conveyor;

a third conveyor arranged on the other side of the first conveyor and including at least one pair of drive and pinch rollers for pinching the magnetic recording medium therebetween to convey the magnetic recording medium to and from the first conveyor; and an actuator for rotationally actuating the drive rollers of the first, second, and third conveyors, respectively.

22. A magnetic recording medium handling system including the magnetic data processing device according to claim 1, the system further comprising, a communicator for communicating trade data between the magnetic data processing device and a trade control center printer for printing the trade data received from the trade control center on the magnetic recording medium, and a conveyor for conveying the magnetic recording medium between the magnetic data processing device and the printer.

* * * * *

UNITED STATES PATENT AND TRADEMARK OFFICE
CERTIFICATE OF CORRECTION

PATENT NO.:    5,808,290
DATED      :    September 15, 1998
INVENTOR(S):    Hideyuki UMENO It is certified that error appears in the above-identified patent and that said Letters Patent is hereby corrected as shown below:

Col. 6,    line 18, change "actuate" to --actuates--.

line 57, change "interconnect two resilient support plates 10i" to --supporting the shaft 10g-- and change "log" to --10g--.

Col. 7,    line 41, change "10i" to --10m--.

Col. 11,    line 46, begin a new paragraph with "wherein,".

Signed and Sealed this

Sixteenth Day of March, 1999

Attest:

Q. TODD DICKINSON

Attesting Officer    Acting Commissioner of Patents and Trademarks